US012766751B2

(12) United States Patent
Robinson

(10) Patent No.: US 12,766,751 B2
(45) Date of Patent: Oct. 20, 2026

(54) FOOD SLICER

(71) Applicant: Howard Robinson, Swansea, IL (US)

(72) Inventor: Howard Robinson, Swansea, IL (US)

( * ) Notice: Subject to any disclaimer, the term of this patent is extended or adjusted under 35 U.S.C. 154(b) by 203 days.

(21) Appl. No.: 18/602,999

(22) Filed: Mar. 12, 2024

(65) Prior Publication Data

US 2025/0289156 A1 Sep. 18, 2025

(51) Int. Cl.
*B26D 1/03* (2006.01)
*B26D 1/00* (2006.01)
*B26D 5/10* (2006.01)

(52) U.S. Cl.
CPC ................. *B26D 1/03* (2013.01); *B26D 5/10* (2013.01); *B26D 2001/0033* (2013.01); *B26D 2001/006* (2013.01); *B26D 2001/008* (2013.01); *B26D 2210/02* (2013.01)

(58) Field of Classification Search
CPC .................................... B26D 5/10; B26D 1/03
See application file for complete search history.

(56) References Cited

U.S. PATENT DOCUMENTS 128,328 A * 6/1872 Schaefer ............... B26B 27/002 30/117
853,796 A * 5/1907 Imes et al. ............. B26D 3/185 83/435.19
1,436,236 A * 11/1922 Cartuschka ............. A01J 23/00 30/128
1,466,114 A * 8/1923 Buchi ...................... B26D 3/26 D7/673
1,478,684 A * 12/1923 Taylor .................... B26D 3/185 83/435.19
1,744,422 A * 1/1930 Taylor ..................... A47J 25/00 D7/693
2,111,035 A * 3/1938 Winslow ................. A01J 23/00 99/537

(Continued)

FOREIGN PATENT DOCUMENTS

DK 2014 00186 U3 4/2016
EP 2 990 166 B1 2/2018

(Continued)

OTHER PUBLICATIONS

PCT Search Report and Written Opinion issued in related application PCT/US2025/019373, Aug. 18, 2025, 13 pages.

(Continued)

*Primary Examiner* — Sean M Michalski
(74) *Attorney, Agent, or Firm* — Faegre Drinker Biddle & Reath LLP

(57) ABSTRACT

A food slicer is described. The food slicer includes a substantially open frame having opposing first and second sides, and a plurality of cutting elements mounted between the first and second sides. The plurality of cutting elements are arranged in parallel and have different lengths according to their position along a length of the open frame. The first and second sides are configured to encircle and pass around a food item on a surface when the open frame is placed over and pushed through the food item onto the surface. The plurality of cutting elements are configured to perform a Hasselback cut into the food item when the open frame is placed over and pushed through the food item onto the surface.

20 Claims, 8 Drawing Sheets

(56) References Cited

U.S. PATENT DOCUMENTS 2,152,198 A * 3/1939 Lowenfels .............. B26B 27/00 30/117
2,509,190 A * 5/1950 Langley ................. B26D 3/185 99/545
2,520,000 A * 8/1950 Dettman .................. B26D 3/30 30/294
3,948,132 A * 4/1976 Camp .................. B26D 7/0608 83/858
4,557,053 A * 12/1985 Hadley, Jr. ............... B26D 3/26 83/425.2
4,580,343 A * 4/1986 Bell, Jr. ................ B26B 29/063 D7/673
4,852,256 A * 8/1989 Schoettler ................. B26B 3/04 99/537
4,998,348 A * 3/1991 Foate ........................ B26B 3/04 30/305
5,613,431 A * 3/1997 Tateno .................... A47J 17/02 83/437.1
5,692,424 A 12/1997 Wallace
D473,109 S * 4/2003 Birchansky .................... D7/673
D501,371 S * 2/2005 Lo .................................. D7/673
D550,521 S * 9/2007 Roberson ....................... D7/672
7,266,894 B1 * 9/2007 Hinckley ................. B26D 3/26 30/337
7,421,786 B2 * 9/2008 Dorion .................... A47J 17/02 30/302
7,480,999 B2 * 1/2009 Atwater ................... B25G 1/00 30/316
7,568,414 B2 * 8/2009 Farid ........................ B26D 3/26 83/425.3
7,730,818 B1 * 6/2010 Kannegieter ............ B26D 1/30 30/304
D648,989 S * 11/2011 Coursey ......................... D7/673
8,448,552 B2 * 5/2013 Hoffman ............... B26B 29/063 83/13
D702,512 S * 4/2014 Harris ............................ D7/673
D776,496 S * 1/2017 Mirchandani .................. D7/672
10,856,554 B2 * 12/2020 Jackson ................. B26D 3/245
D924,641 S * 7/2021 Davies ........................... D7/673
2002/0100173 A1 * 8/2002 Suer ......................... B26D 3/24 30/124
2007/0044619 A1 * 3/2007 Farid ........................ B26D 3/26 83/932
2009/0241344 A1 * 10/2009 Mastroianni ............. B26D 3/26 30/355
2009/0282990 A1 * 11/2009 Farnum ..................... B26B 3/04 30/152
2010/0275792 A1 * 11/2010 Brown ................... B26D 3/185 83/167
2012/0102760 A1 * 5/2012 Hauser ..................... B26D 7/18 83/13
2012/0131800 A1 * 5/2012 Hauser ..................... B26D 3/26 30/279.2
2015/0209973 A1 7/2015 Hauser et al.
2016/0207212 A1 * 7/2016 Rogers ..................... B26D 7/06
2018/0008082 A1 * 1/2018 Dasen, Jr. ............. A47J 27/002
2018/0154536 A1 * 6/2018 Repac ..................... B26B 27/00
2021/0237302 A1 * 8/2021 Rhodes ................ B26D 7/2614

FOREIGN PATENT DOCUMENTS

EP 3 488 982 A1 5/2019
WO 2015/003720 A1 1/2015
WO 2022/218674 A1 10/2022

OTHER PUBLICATIONS

Lekue, "Hasselback Cutter," Product Description, 2023, retrieved from: https://www.lekue.com/us/hasselback-cutter on Aug. 2, 2023, 4 pages.

* cited by examiner

FOOD SLICER

BACKGROUND

Food preparation is often a time-consuming task, whether performed in a restaurant environment for many orders or in a home for a small group or even an individual. Some techniques for food preparation are specialized and may be difficult to perform quickly and accurately. For example, preparation of Hasselback potatoes includes slicing a potato, but not all the way through the potato. When performed with a knife, careful attention must be given to avoid cutting all the way through the potato, which draws out the time needed to prepare the Hasselback potato.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to an apparatus for slicing food.

According to an aspect, a food slicer is provided. The food slicer comprises a substantially open frame having opposing first and second sides and a plurality of cutting elements mounted between the first and second sides. The plurality of cutting elements are arranged in parallel and have different lengths according to their position along a length of the open frame. The first and second sides are configured to encircle and pass around a food item on a surface when the open frame is placed over and pushed through the food item onto the surface. The plurality of cutting elements are configured to perform a Hasselback cut into the food item when the open frame is placed over and pushed through the food item onto the surface.

According to another aspect, another food slicer is provided. The food slicer comprises an open frame having a perimeter configured to encircle a food item on a surface and a plurality of elongated cutting elements arranged in parallel within the open frame. The plurality of elongated cutting elements are arranged with a plurality of standoff distances from a base of the open frame. The plurality of standoff distances increase from a minimum value for first elongated cutting elements near a center of the open frame to a maximum value for second elongated cutting elements near ends of the open frame.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

Figure 1:
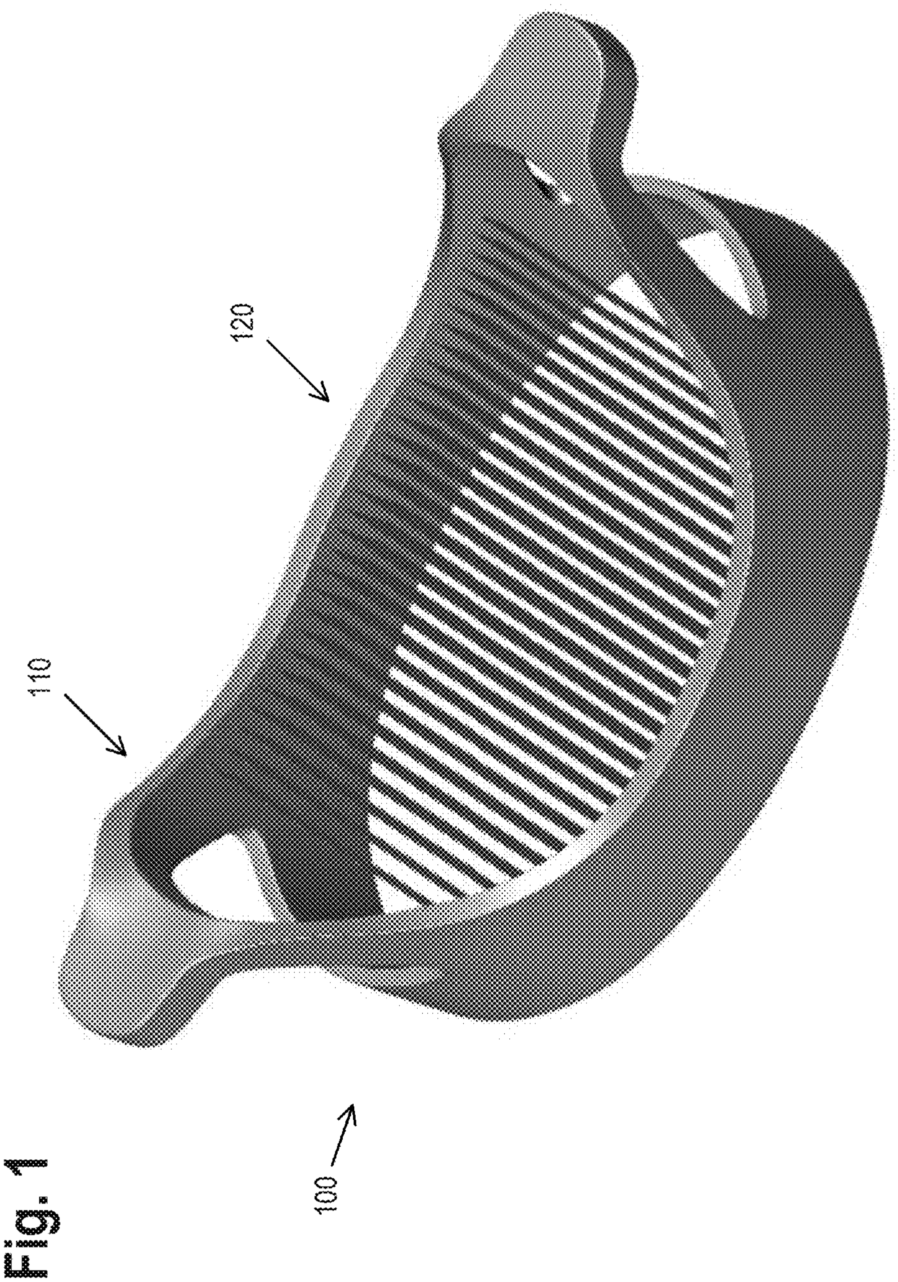
FIG. 1 shows a perspective view of an example food slicer, according to an example embodiment.
Figure 4A:
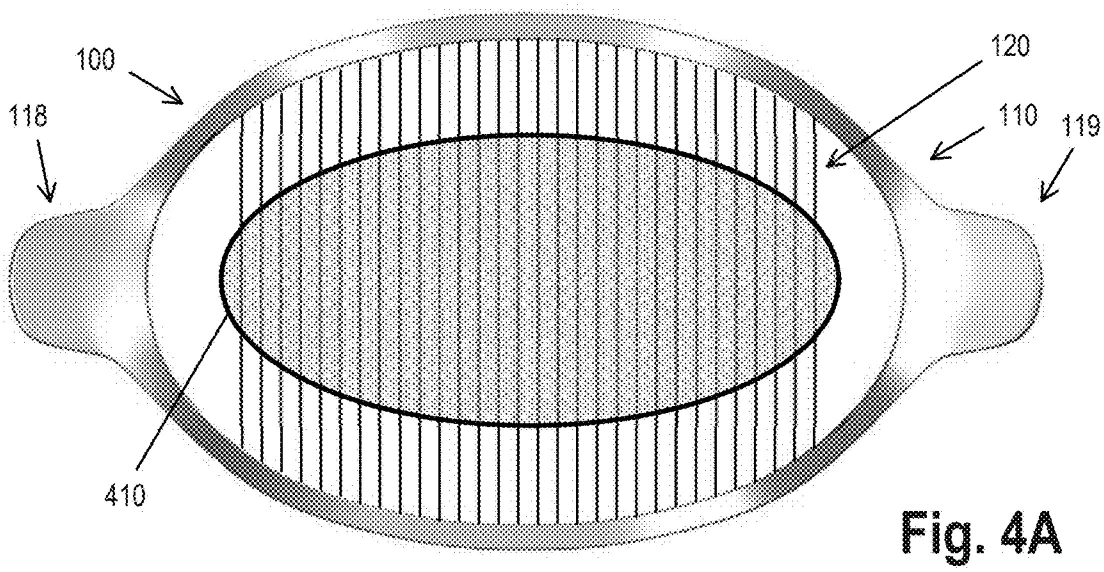
Figure 4B:
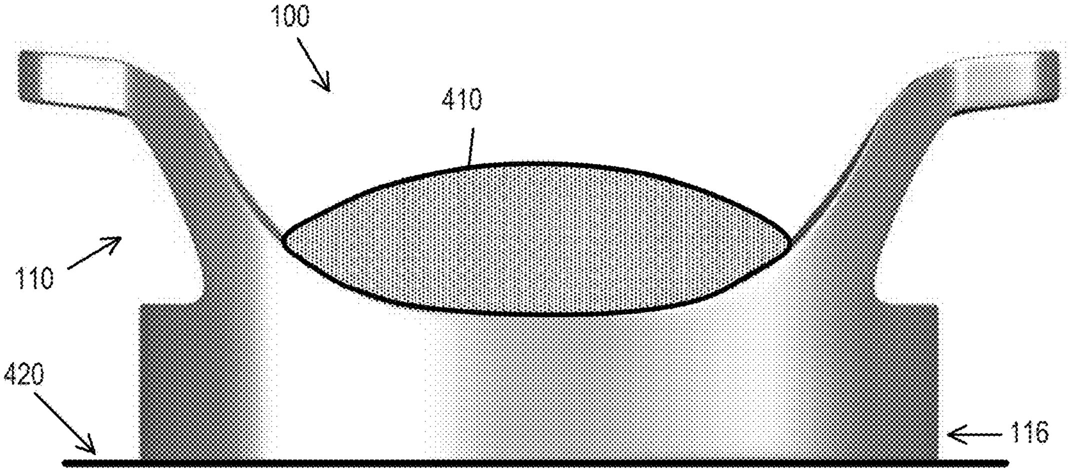
Figure 4C:
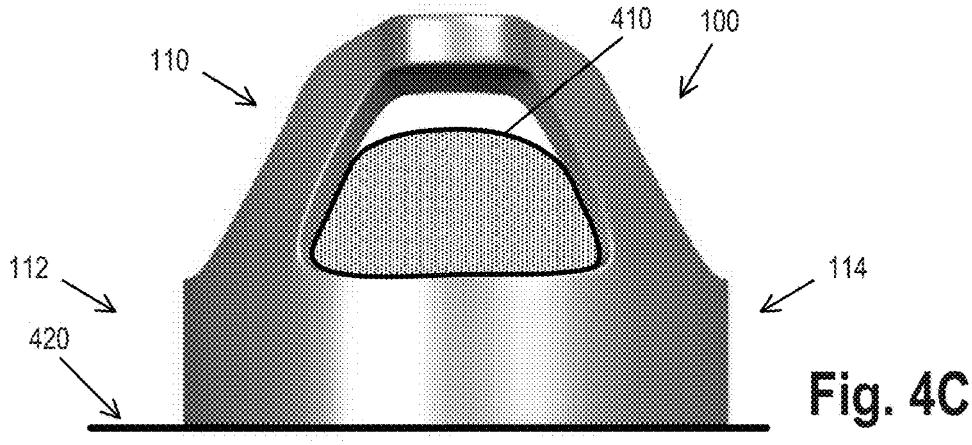

FIG. 4A, FIG. 4B, and FIG. 4C show a top view, side view, and end view of the food slicer of FIG. 1, according to an example embodiment.

Figure 5:
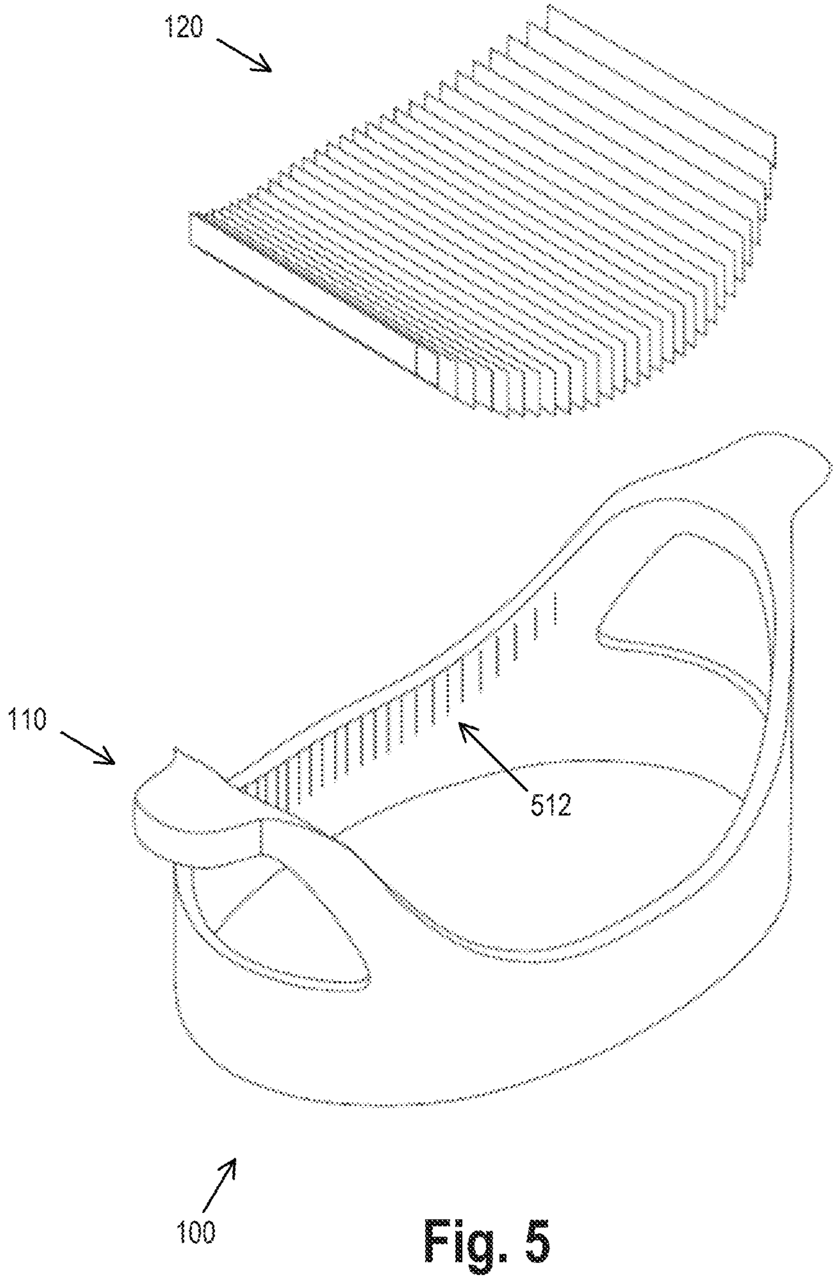

FIG. 5 shows an exploded perspective view of the food slicer of FIG. 1, according to an example embodiment.

Figure 6A:
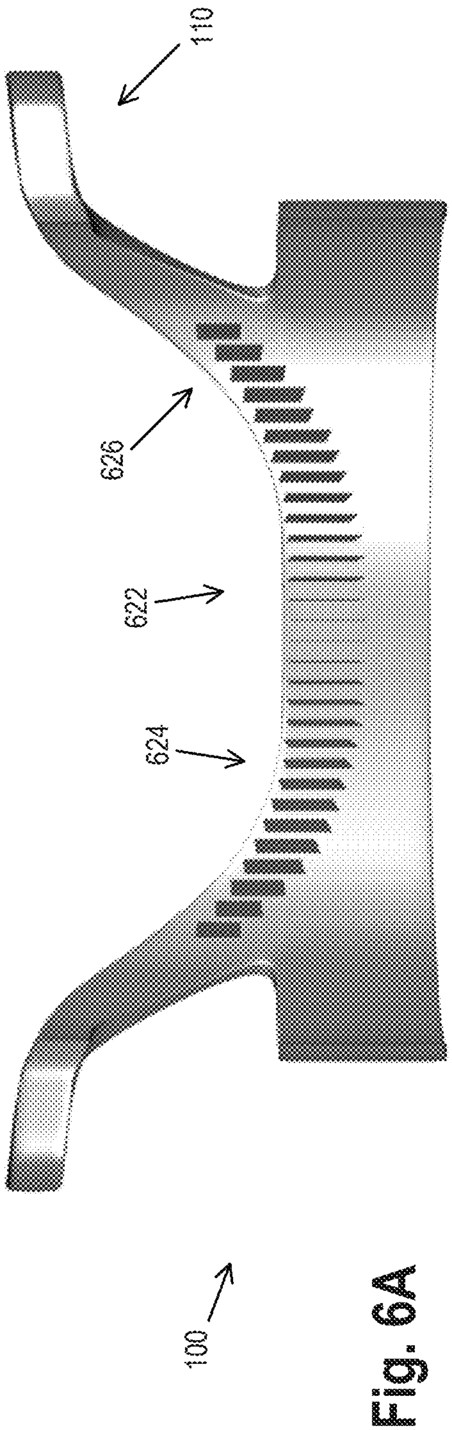
Figure 6B:
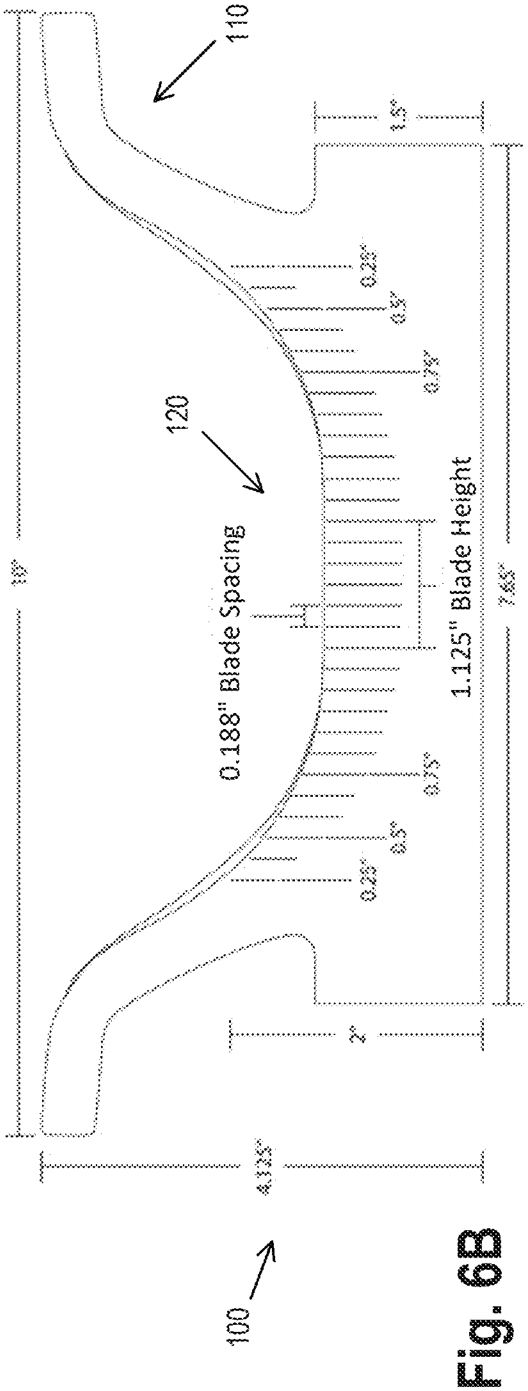

FIG. 6A and FIG. 6B show a cross sectional view and a schematic view of a side of the food slicer of FIG. 1, according to an example embodiment.

Figure 7:
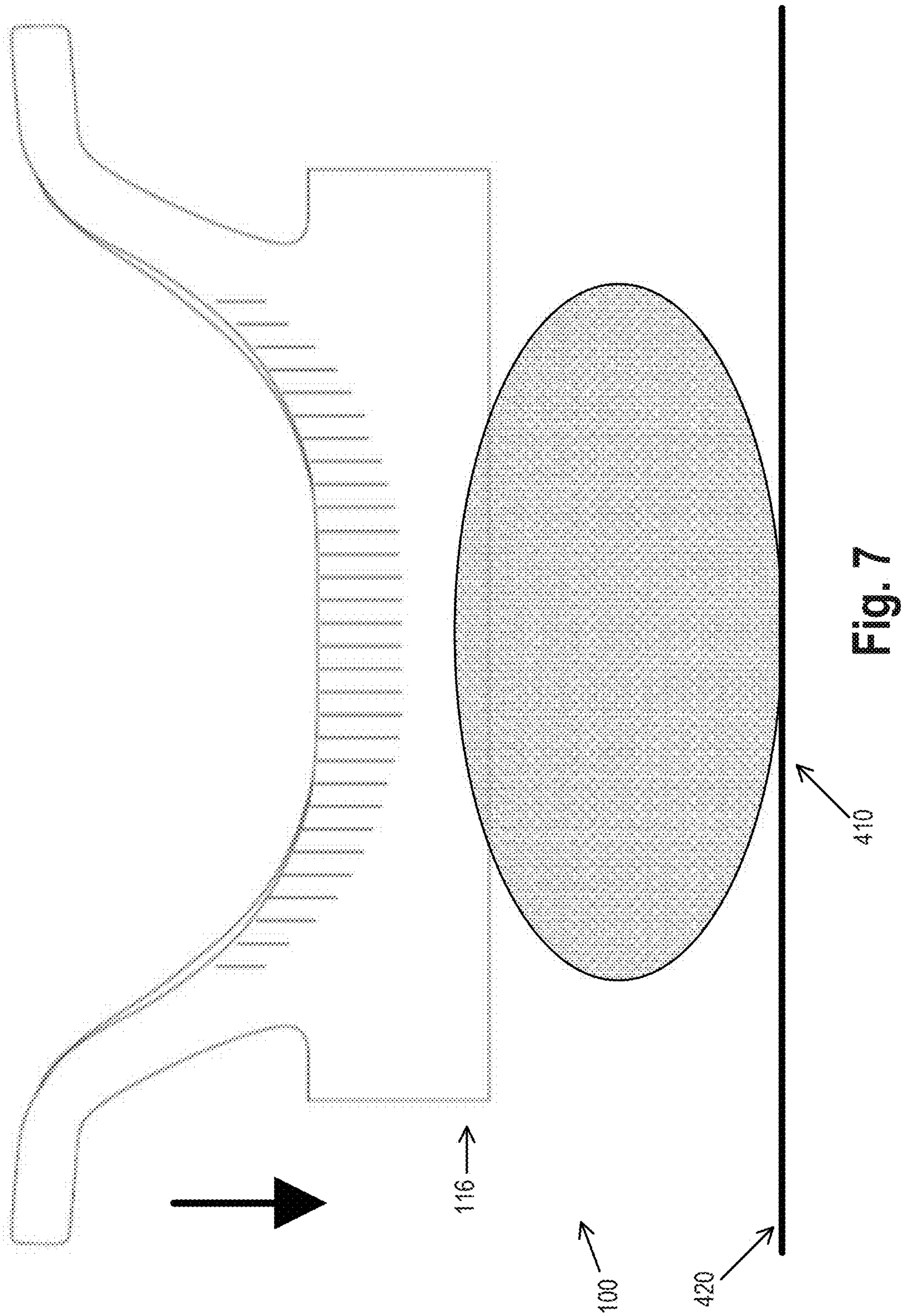

FIG. 7 is a schematic view of the food slicer of FIG. 1 before slicing a food item, according to an example embodiment.

Figure 8:
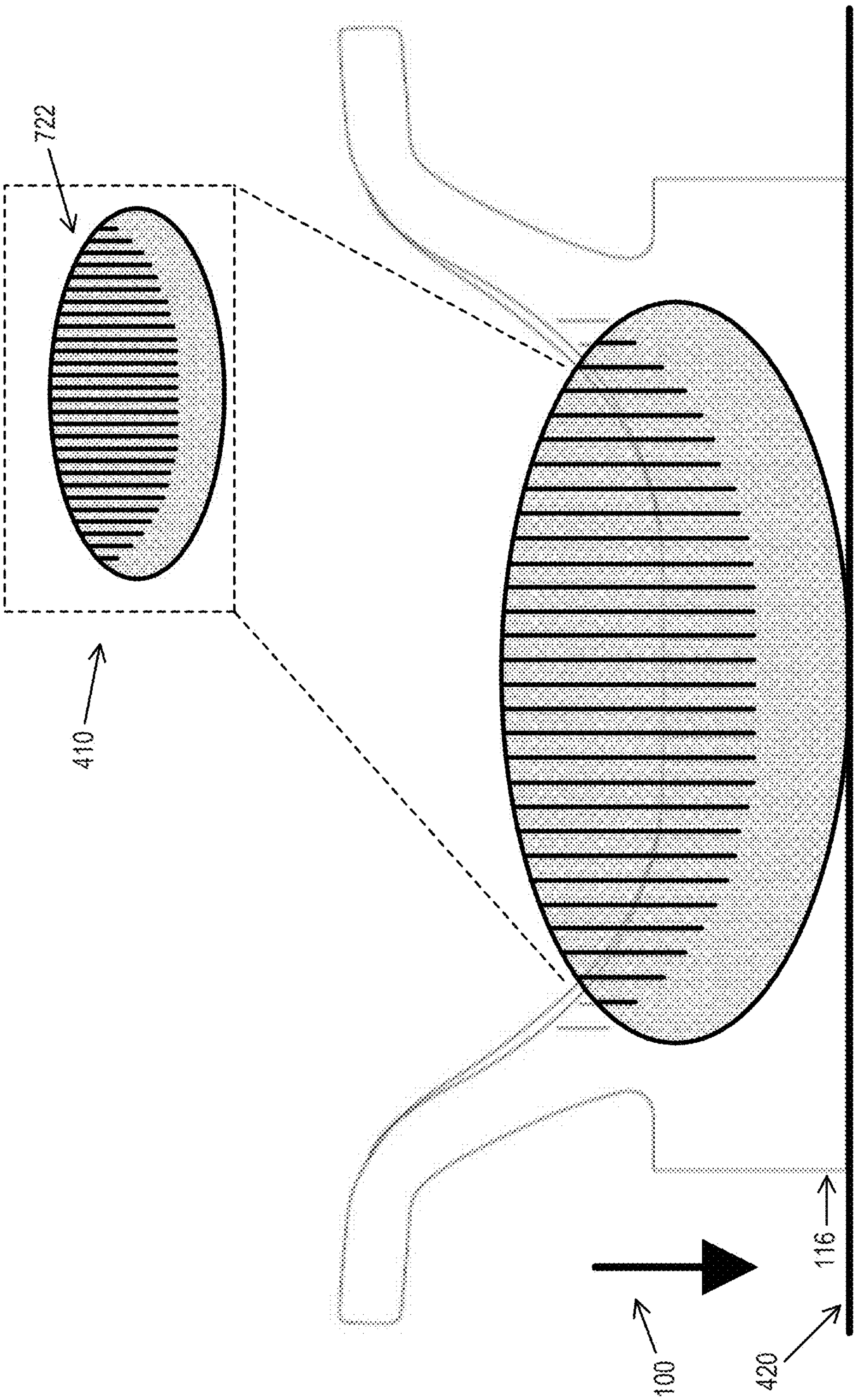

FIG. 8 is a schematic view of the food slicer of FIG. 7 after slicing the food item, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. The following detailed description is therefore not to be taken in a limiting sense, and the scope of the present disclosure is defined by the appended claims and their equivalents.

The present disclosure describes various examples of a food slicer configured to partially slice through a food item, such as a potato or other vegetable. The food slicer generally provides an efficient way of preparing Hasselback potatoes, but may be used for a similar slicing technique on other food items (e.g., onions, sweet potatoes). For improved safety, cutting elements of the food slicer are partially enclosed within a frame, reducing a likelihood of a user cutting themself. The cutting elements are arranged in parallel and so that as the frame is pushed downwards towards a cutting surface, the cutting elements slice or cut through the potato, without cutting through a lower edge of the potato (or food item). Generally, each cutting element may have a different standoff distance from a base of the frame so that when the base of the frame reaches the cutting surface, stopping the cutting element from cutting further through the food item, the cutting element is separated from the cutting surface by the standoff distance. Although Hasselback potatoes may be prepared using the food slicer, other forms of decorative slicing on different food items may be performed as well.

Figure 2:
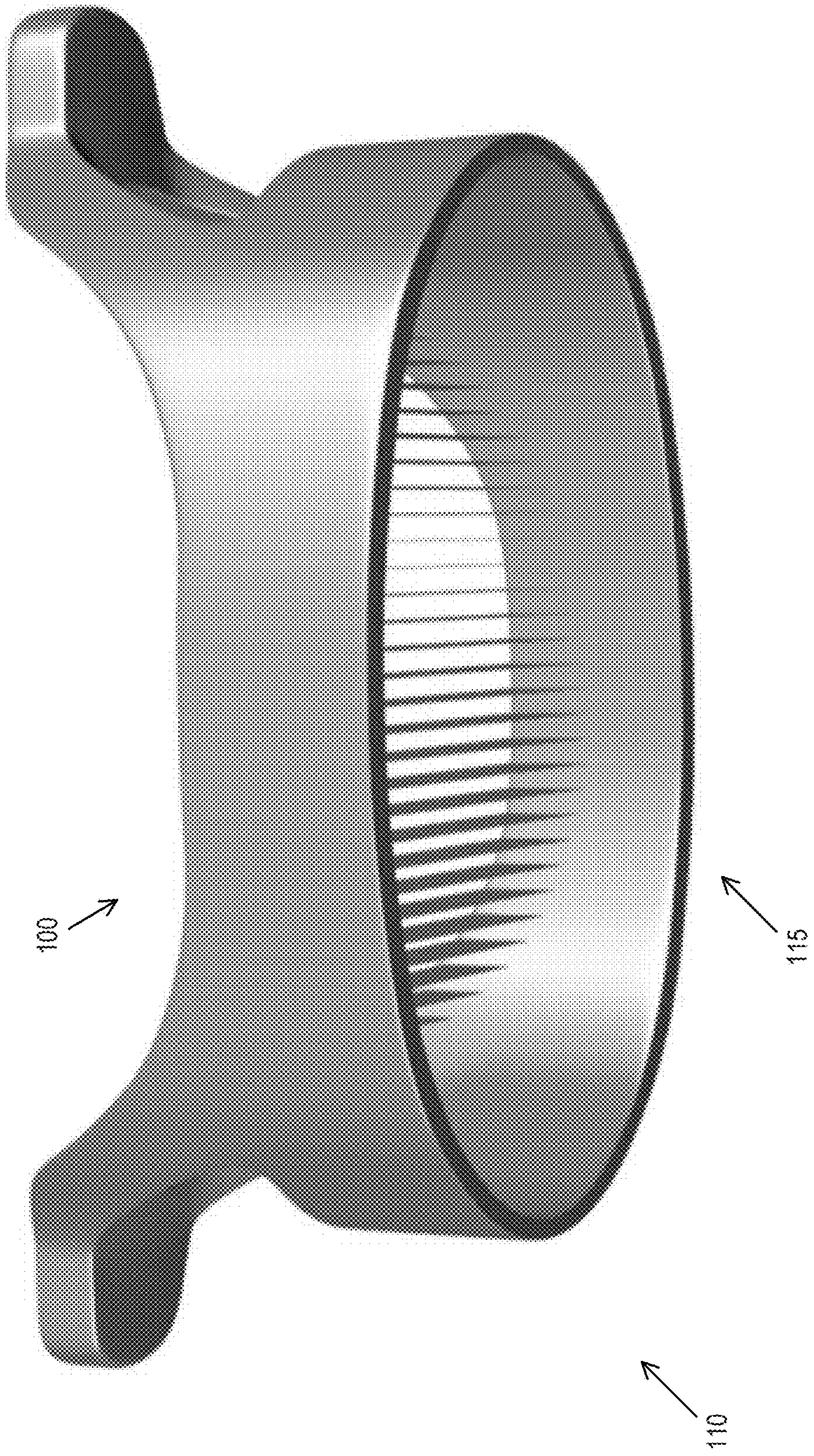
FIG. 2 shows another perspective view of the food slicer of FIG. 1, according to an example embodiment.
Figure 3:
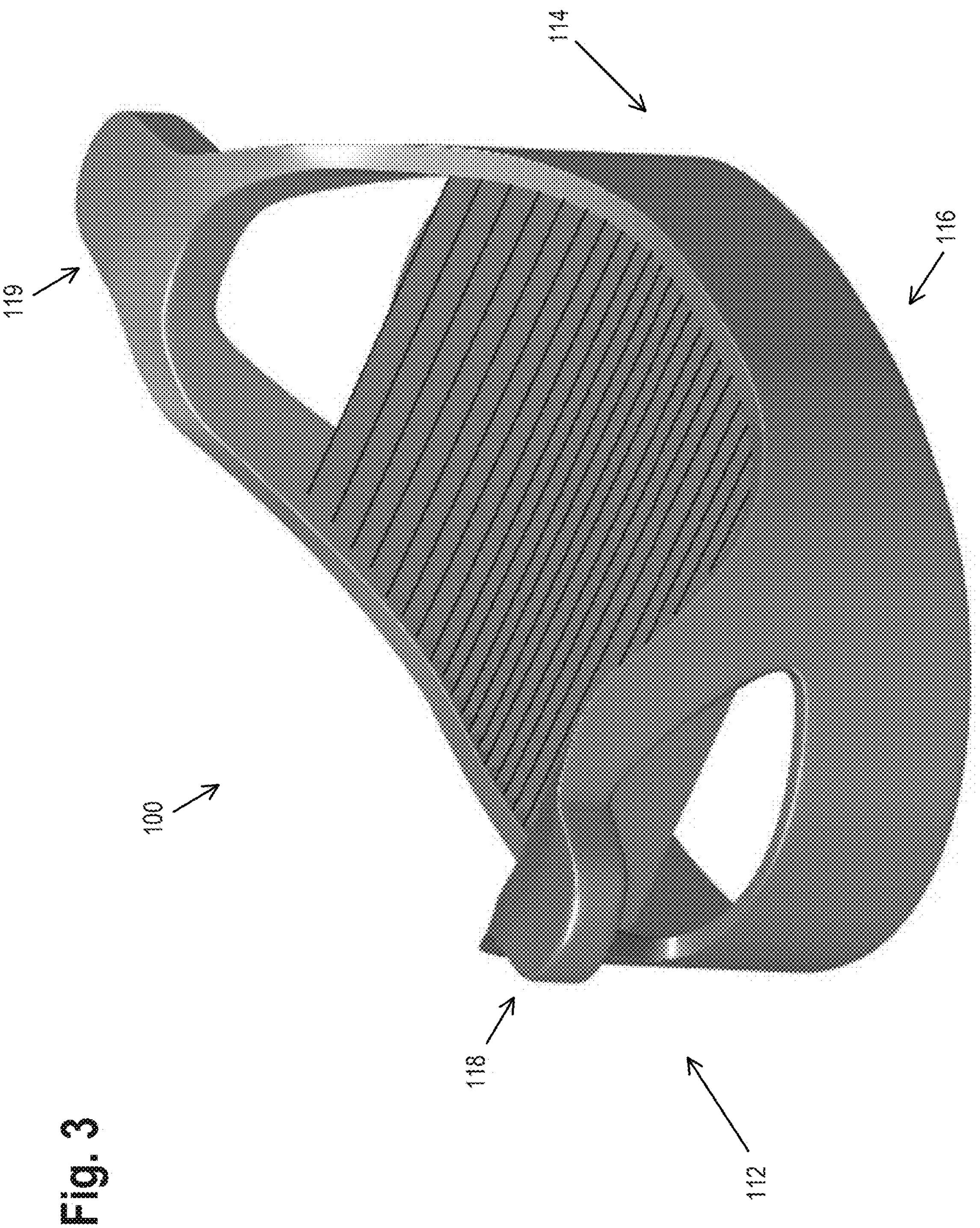
FIG. 3 shows a lower perspective view of the food slicer of FIG. 1, according to an example embodiment.

This and many further embodiments for a food slicer are described herein. FIG. 1, FIG. 2, and FIG. 3 show various perspective views of a food slicer 100, according to an example embodiment. FIG. 4A, FIG. 4B, and FIG. 4C show a top view, side view, and end view of the food slicer 100 with a food item 410. FIG. 5 shows an exploded perspective view of the food slicer 100. FIG. 6A and FIG. 6B show a cross sectional view and a schematic view of a side of the food slicer 100. FIGS. 7 and 8 are schematic views of the food slicer 100 before and after slicing the food item 410.

In the illustrated examples, the food item 410 is a potato and use of the food slicer 100, described below, cuts the potato for preparation of a Hasselback baked potato (i.e., a Hasselback cut). In other examples, the food item 410 may be an onion, sweet potato, eggplant, bell pepper, or other suitable food item.

Referring to FIGS. 1 and 2, the food slicer 100 comprises a frame 110 that supports a plurality of cutting elements 120. In the example shown in FIG. 1, the plurality of cutting elements 120 are implemented as a plurality of elongated blades, but could be implemented as thin wires (e.g., approximately 8 to 32 thousandths of an inch in diameter), or other suitable cutting elements, in other examples. The frame 110 generally encircles and passes around the food item 410 when the frame 110 is placed over and pushed through the food item 410. For example, a user may hold the frame 110 over the food item (FIG. 7) and push downwards to cause the blades to slice or cut into the food item 410 (FIG. 8). In some examples, the plurality of cutting elements are contained within an outer perimeter of the frame 110.

Referring to FIGS. 2 and 3, the frame 110 is a substantially open frame having first and second opposing sides 112 and 114 that encircle the food item 410, allowing the food item 410 to pass through an opening 115 of the frame 110. For the food slicer 100 shown in the figures, the frame 110 encircles the entire food item 410 with a generally oval or elliptical shape corresponding to a shape of a potato. In other examples, the frame 110 may have a different shape suitable for other food items, such as a circular shape (e.g., for onions), a rectangular shape (e.g., for eggplant), a square shape, etc. In the example shown in the figures, the frame 110 is approximately 10 inches long by 5.25 inches wide and 4.125 inches tall (see FIG. 6B).

The frame 110 includes a base 116 that may be configured for resting the frame 110 on a flat surface (e.g., surface 420), such as a cutting board or counter top. With this configuration, the base 116 provides a positive tactile stopping point for feedback to the user when pushing the frame 110 over the food item 410, indicating that the cut has been completed. In other examples, the base 116 has a rounded profile or angled profile to allow for a rocking motion to aid in cutting the food item 410. For example, the food slicer 100 may be rocked from the first side 112 towards the second side 114 and back to the first side 112 over a pivot line (not shown) that is perpendicular to the cutting elements 120, gradually slicing the food item 410 (or increasing a spacing between cut portions) with the cutting elements 120.

For improved usability, the frame 110 may comprise one or more handles, tabs, or other suitable engagement points that may be manipulated by the user to cause the food slicer 100. In the example shown in the figures, the frame 110 includes tabs 118 and 119 that are configured to be pressed by a user by their thumbs, palms, etc. to push the frame 110 and cutting elements through the food item 410. In the example shown in the figures, the tabs 118 and 119 are positioned at locations along a central line (not shown) intersecting midpoints of the plurality of cutting elements 120. In other examples, different handles, alternatively or in addition to the tabs 118 and 119, are positioned at locations along the opposing sides 112 and 114. In some examples, handles of the frame 110 are located above the plurality of cutting elements. In other examples, the handles of the frame 110 are located further from the base than the plurality of elongated cutting elements.

In one such example, the user may press on one handle over the side 112 to rock the frame 110 in a first direction and then press on another handle over the side 114 to rock the frame 110 in a second direction to perform the rocking motion described above. In another example, the frame 110 includes an engagement point (not shown) that is located above the plurality of cutting elements 120 (e.g., on a bridge that passes over the plurality of cutting elements). In this example, the user may push down directly onto the engagement point to cause the blades to slice or cut into the food item 410.

The frame 110 may be formed from food grade plastic, such as polypropylene (PP), high density polyethylene (HDPE), etc. In other examples, the frame 110 is formed from a metal or metal alloy, such as aluminum, stainless steel, etc. In still other examples, the frame 110 may be formed from wood (e.g., bamboo), glass, ceramic, or other suitable materials. The frame 110 may be manufactured using any suitable process for its material, such as a molding process, casting process, 3D printing process, machining process (e.g., CNC machining), or other suitable process.

Generally, the plurality of cutting elements 120 are mounted, in parallel, between the first and second sides 112 and 114 and may be located at fixed positions along the frame 110. In the example shown in the figures, a spacing between the cutting elements 120 is approximately 0.188 inches (3/16"), but other spacings may be used. In some examples, the plurality of cutting elements 120 have different lengths according to their position along a length of the open frame 110.

Referring to FIG. 5, the frame 110 may be formed with linear recesses 512 configured to receive and secure edges of the plurality of cutting elements 120. In some examples, the frame 110 is molded over the cutting elements to form a hygienic interface that is more easily cleaned. Referring to FIG. 6A, cutting elements 624 and 626 (located at opposing ends of the frame where the sides 112 and 114 are closer together) are shorter in length than the cutting elements 622 (located near a middle of the frame where the sides 112 and 114 are further apart). As another example, the cutting elements shown in FIG. 4A are shorter in length as they become closer to the tabs 118 and 119. Having a reduced length allows for a reduction in manufacturing cost of the food slicer 100.

The plurality of cutting elements 120 are configured to perform a Hasselback cut into a food item 410 when the open frame 110 is placed over and pushed through the food item. In other words, a cutting depth of each cutting element is varied to prevent cutting all the way through the food item 410. Generally, the food item 410 is placed on a surface 420, such as a cutting board or other food preparation surface, the food slicer 100 is placed over the food item 410, and the food slicer 100 is pushed downwards towards the surface 420 by a user. The food item 410 is sliced with a plurality of cuts 722 of varying depths to achieve the Hasselback cut. In other words, the plurality of cutting elements may be arranged with a plurality of standoff distances from a base of the open frame, where the plurality of standoff distances increase from a minimum value (e.g., 0.375") for first elongated cutting elements near a center of the open frame to a maximum value (e.g., 1.75") for second elongated cutting elements near ends of the open frame.

The plurality of cutting elements 120 are arranged in the open frame 110 to provide an increased cutting depth, relative to the surface 420, towards a middle of the frame 110. In other words, when the open frame 110 is pushed through to the surface 420, blades at a middle of the frame 110 are closer to the surface 420 than blades at the ends of the frame 110. In one example, the cutting depth of the plurality of cutting elements 120 near the middle of the open frame 110 reaches to within approximately 3/8 of an inch of the surface 420, while the cutting depth of the plurality of cutting elements 120 near the opposing ends of the first and second sides 112 and 114 reaches to within approximately 1.75 inches of the surface 420. Generally, a position of each cutting element 120 (i.e., its respective standoff distance) is selected to conform to a lower edge of a desired food item 410 with a suitable offset. In the example shown, the food item 410 is a potato and a contour of the cutting elements

120 generally follows the lower edge of the potato with a suitable offset of approximately ⅜ of an inch.

In some examples, the plurality of cutting elements 120 have a reduced blade height towards the opposing ends of the first and second sides 112 and 114, where the blade height is a distance from a cutting edge to a spine of the cutting element. Referring to FIG. 6A and FIG. 6B, the cutting elements 622 may have a blade height of 1.125 inches, the cutting elements 624 may have a blade height of 0.75 inches, and the cutting elements 626 may have a blade height of 0.5 inches. In some examples, the reduced blade height reduces friction between the cutting elements 120 and the food item 410.

In various implementations, the plurality of cutting elements 120 are formed from stainless steel, hardened steel (e.g., carbon steel suitable for kitchen knives), ceramic, or other suitable materials. The plurality of cutting elements 120 may be formed as straight blades, scalloped blades to reduce a likelihood of the food item 410 sticking to the blade, or serrated blades, in various implementations. In some examples, serrated blades are used to improve cutting performance when cutting using a slicing motion.

Referring to FIG. 7 and FIG. 8, an example of use of the food slicer 100 is shown. In FIG. 7, the food slicer 100 is placed over a food item 410 located on a surface 420. As the food slicer 100 is pushed downwards towards the surface 420 by a user, the plurality of cutting elements 120 cut through the food item 410. In this example, the downward motion causes a chopping motion with the plurality of cutting elements 120.

In other examples, instead of only pushing downwards, the user may perform a push cut, pull cut, or sawing cut (i.e., back and forth). For example, the frame 110 and plurality of cutting elements 120 may be elongated to provide space for the plurality of cutting elements 120 to be pushed and pulled laterally (i.e., into and out of the page of FIG. 7 and FIG. 8) to cause a slicing motion in addition to pushing downwards. As described above, the plurality of cutting elements 120 may be formed with serrated blades to improve cutting performance when slicing. Although not shown, in some examples, the food slicer 100 further comprises a base, such as a cutting board, having a food holding mechanism, such as one or more spikes or protrusions onto which the food item 410 may be secured, or a V-shaped channel that holds the food item 410 steady while the slicing motion is performed.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

What is claimed is:

1. A food slicer, comprising:

an open frame having opposing first and second sides; and a plurality of cutting elements mounted between the first and second sides;

wherein the plurality of cutting elements are arranged in parallel and have different lengths according to their position along a length of the open frame;

wherein the first and second sides are configured to encircle and pass around a food item on a surface when the open frame is placed over and pushed through the food item onto the surface; and wherein the plurality of cutting elements are configured to perform a Hasselback cut into the food item when the open frame is placed over and pushed into the food item, cutting into the food item such that an uncut portion of the food item remains above the surface.

2. The food slicer of claim 1, wherein the plurality of cutting elements have reduced lengths toward opposing ends of the first and second sides.

3. The food slicer of claim 1, wherein the plurality of cutting elements are arranged in the open frame to provide an increased cutting depth, relative to the surface, towards a middle of the open frame.

4. The food slicer of claim 3, wherein the plurality of cutting elements are configured to cut to within 0.375 inches of the surface near a middle of the open frame and to within 1.75 inches near opposing ends of the first and second sides.

5. The food slicer of claim 3, wherein the plurality of cutting elements have a reduced blade height towards opposing ends of the first and second sides.

6. The food slicer of claim 3, wherein the plurality of cutting elements are straight blades.

7. The food slicer of claim 3, wherein the plurality of cutting elements are scalloped blades.

8. The food slicer of claim 3, wherein the plurality of cutting elements are wires.

9. A food slicer, comprising:

an open frame having a perimeter configured to encircle a food item on a surface; and a plurality of elongated cutting elements arranged in parallel within the open frame;

wherein the plurality of elongated cutting elements are arranged with a plurality of standoff distances from a base of the open frame; and wherein the plurality of standoff distances increase from a minimum value for first elongated cutting elements positioned nearest a center of the open frame to a maximum value for second elongated cutting elements positioned farthest from the center of the open frame.

10. The food slicer of claim 9, wherein the base of the open frame is configured to encircle and pass around the food item when the open frame is placed over and pushed towards the surface; and wherein the plurality of elongated cutting elements are configured to perform a Hasselback cut into the food item when the base is placed over and pushed through the food item onto the surface.

11. The food slicer of claim 10, wherein the open frame has handles located above the plurality of elongated cutting elements.

12. The food slicer of claim 11, wherein the handles are located at opposing sides of the plurality of elongated cutting elements.

13. The food slicer of claim 10, wherein the open frame has handles located further from the base than the base is from the plurality of elongated cutting elements.

14. The food slicer of claim 10, wherein the minimum value of the plurality of standoff distances is approximately 0.375 inches and the maximum value of the plurality of standoff distances is approximately 1.75 inches.

15. The food slicer of claim 10, wherein a spacing between the plurality of elongated cutting elements is about 0.1875 inches.

16. The food slicer of claim 10, wherein the plurality of elongated cutting elements are elongated blades.

17. The food slicer of claim 10, wherein the plurality of elongated cutting elements are wires.

18. The food slicer of claim 10, wherein the plurality of elongated cutting elements are contained within an outer perimeter of the open frame.

19. The food slicer of claim 10, wherein the first elongated cutting elements having the minimum value of the plurality of standoff distances are longer in length than the second elongated cutting elements having the maximum value of the plurality of standoff distances.

20. The food slicer of claim 19, wherein the first elongated cutting elements having the minimum value of the plurality of standoff distances are taller in blade height than the second elongated cutting elements having the maximum value of the plurality of standoff distances.

* * * * *